United States Patent [19]
Munroe et al.

[11] Patent Number: 5,581,765
[45] Date of Patent: Dec. 3, 1996

[54] SYSTEM FOR COMBINING A GLOBAL OBJECT IDENTIFIER WITH A LOCAL OBJECT ADDRESS IN A SINGLE OBJECT POINTER

[75] Inventors: Steven J. Munroe, Rochester, Minn.; Abolfazi Sirjani, Austin, Tex.; Erik E. Voldal, Rochester, Minn.

[73] Assignee: International Business Machines Corporation, Armonk, N.Y.

[21] Appl. No.: 299,042

[22] Filed: Aug. 30, 1994

[51] Int. Cl.$^6$ .................................. G06F 9/44; G06F 9/00
[52] U.S. Cl. ..................... 395/677; 395/683; 364/246; 364/246.1; 364/246.11; 364/DIG. 1
[58] Field of Search .................................. 395/200, 700, 395/650; 364/200, DIG. 1

[56] References Cited

U.S. PATENT DOCUMENTS

| | | | |
|---|---|---|---|
| 4,450,522 | 5/1984 | Pilat et al. | 364/200 |
| 4,455,602 | 6/1984 | Baxter, III et al. | 364/200 |
| 4,821,184 | 4/1989 | Clancy et al. | 364/200 |
| 4,851,988 | 7/1989 | Trottier et al. | 364/200 |
| 4,853,842 | 8/1989 | Thatte et al. | 364/200 |
| 5,062,038 | 10/1991 | Brown et al. | 364/200 |
| 5,117,351 | 5/1992 | Miller | 395/650 |
| 5,129,083 | 7/1992 | Cutler et al. | 395/600 |
| 5,136,716 | 8/1992 | Harvey et al. | 395/800 |
| 5,187,790 | 2/1993 | East et al. | 395/725 |
| 5,265,206 | 11/1993 | Shackelford et al. | 395/200 |
| 5,329,619 | 7/1994 | Page et al. | 395/200 |
| 5,410,705 | 4/1995 | Jones et al. | 395/700 |

OTHER PUBLICATIONS

J. S. Chase, et al., "The Amber System: Parallel Programming On A Network Of Multiprocessors", Dec. 1989, pp. 1–20, Department of Computer Science, University of Washington, Seattle, Washington 98195.

E. Jul, et al., "Fine–Grained Mobility in the Emerald System", Dec. 1987, pp. 1–22, Department of Computer Science, University of Washington, Seattle, Washington 98195.

*Primary Examiner*—Kevin A. Kriess
*Assistant Examiner*—Majid A. Banankhah
*Attorney, Agent, or Firm*—Baker, Maxham, Jester & Meador

[57] ABSTRACT

An object pointer data structure for efficiently combining an object identifier and an object address for use in object-oriented programming systems. An object address is a value that allows a client application or process to conduct high-performance operations on an object in the client's local virtual address space. An object identifier is a value that can be used to uniquely identify an object for the lifetime of that object across some defined domain, such as an entire universe of computer systems. The data structure of this invention defines an object pointer that is larger than the object address but smaller than the combination of the object identifier and object address. The truncated object pointer structure preserves all information from both object address and object identifier by forcing a portion of the local object address in each address space to be equal to a portion of the invariant object identifier. A local pointer mapping table may be used for efficiency in assigning local addresses to restored objects in each process.

13 Claims, 5 Drawing Sheets

SYSTEM FOR COMBINING A GLOBAL OBJECT IDENTIFIER WITH A LOCAL OBJECT ADDRESS IN A SINGLE OBJECT POINTER

BACKGROUND OF THE INVENTION

1. Field of the Invention

This invention relates generally to addressing objects in an object-oriented programming environment.

2. Discussion of the Related Art

Large computer systems permitting many users to simultaneously use single computer resources are herein denominated multitasking computer systems. Such multitasking systems can be interconnected through networks to permit concurrent processing over a distributed plurality of computer resources. The concurrent activities of a large number of simultaneous users are managed by an operating system, which must provide the necessary data structures for tracking and controlling many concurrent processes. Requisite data structures include those needed to manage the distributed memory and the multiple central processing unit (CPU) resources that are used by user processes throughout the network.

If every user process were completely independent, having its own dedicated resources, and there were no concerns about which resources each process must use, operated systems could be relatively simple. However, networked or distributed computer resources are usually shared by many user processes, each requiring access to commonly-owned resources. In fact, each user process may generate a number of simultaneous execution threads that must also share resources among themselves and communicate with the threads and processes of other users.

Modern operating systems employ object architectures to govern data access and transfers among concurrent processes. As used herein, objects include data structures holding information that must be protected from unauthorized access by other user processes. Objects are created by the operating system responsive to user requests and are structured to permit access by the requesting user through system routines that protect the integrity of each object.

The concepts of object identifier and object address (or reference) are well-known in the typical object-oriented programming art. As used herein, an object identifier denominates a value that can be used to uniquely identify an object for the lifetime of that object across some defined domain, such as a single system, a network of systems or the set of all systems in some predefined universe. As used herein, an object address (or reference) denominates a value that allows a user application to conduct high-performance operations on an object in a local virtual address space assigned to the associated user application process. An object address need not be unique in any domain broader than the local virtual address space in which it is used. As known in the art, the concepts of object identifier and object address are separate and distinct.

An object identifier is needed to identify an object having a lifetime that exceeds its local address lifetime. Object identifiers are used, for instance, to manage a network of objects, herein denominating a structure embracing a multiplicity of objects linked together by stored object identifiers each linked to an object within the multiplicity. When an object must be moved from one system to another or from one process to another, for instance, to permit controlled access by many different users, the only consistent means available for tracking such objects is the object identifier, which remains invariant during the interprocess transition from one virtual address space to another.

Because object address and object identifier are conceptually distinct and have independent values, the systems programmer must provide for both. For instance, storage must be allocated for both, storing and updating operations must be allocated for both and so forth. This doubled complexity reduces programming productivity and increases the probability of programming error. There is, accordingly, a clearly-felt need in the art to provide both functions in a single data structure. Although this could be accommodated merely by concatenating the two values into a single double-sized data structure, such a solution offers no reduction in programming complexity because no storage allocation or updating operations are thereby avoided.

Practitioners in the art have proposed a number of solutions to the object-oriented programming complexity problem. For instance, one solution uses a server process that temporarily impersonates the characteristics of a client process when the client process performs a remote procedure call on the server process in a multitasking system. This impersonation is accomplished by creating a new object identifier list that is either the same as the client process list or represents the union of the server and client lists. Such an access control list is provided in each object to define those identifiers required to access the object. Thus, when the identifier list is modified to map all necessary identifiers to local addresses, access checking software in the operating system may then enable the impersonating process to access the specified object. This solution arguably increases programming complexity to accomplish the necessary manipulation of mapping tables that relate object identifiers to local addresses.

Similarly, another solution uses a system for creating "conditional" objects having different object pointers for accessing selected system resources. This object-based operating system supports multiple levels of visibility, thereby permitting objects to be manipulated only by processes within the object's "range" of visibility. An object or an object network can be moved up to a higher visibility level for more object sharing and down to a lower visibility level for more restricted or privileged access. The visibility restriction is achieved by giving each process a pointer (object identifier) to its own process-level container directory and providing for a "public display" container directory permitting interprocess object access. Thus, such a scheme requires a multiplicity of different directories and object identifier mapping tables within each process for linking each global object identifier to various local virtual addresses, increasing rather than reducing programming complexity.

Another approach achieves a virtual look-aside facility for maintaining named data objects in class-related data spaces in virtual storage by providing for an ordered list of "major names" within each user process that is sequentially searched for a specified "minor name" to obtain a virtual storage copy of a data object. This requires a control structure designed to capture information about the location of data within a tree structure that is implicitly created by a naming technique that is commonly used during routine caching operations. This information by-product, selectively used to improve performance in subsequent transactions, does nothing to reduce the programming complexity associated with object naming conventions.

Also known in the art is an object identifier generator for producing unique identifiers in a distributed computer system by concatenating the identifier of the creating node firstly with a creation time from an associated clock adjusted to ensure uniqueness, secondly with a random name-sequence, and finally with a system version number. This generator ensures the creation of an object identifier that is unique across an indefinite universe of computer systems but does not affect the programming complexity problem.

Other related approaches include a system environment that employs workspace name tables for linking packaged workspaces (user processes). An active workspace accesses a loaded copy of the packaged workspaces using the external names of named objects in a packaged workspace rather than the internal names of its own named objects. This system is controlled through a packaged workspace name table stored in the active workspace, which can be merged with other name tables from other packaged workspaces and also shared among a plurality of active workspaces. As with other known object identifier to local address mapping schemes, this system merely maps object identifiers to local addresses and does nothing to reduce programming complexity.

It can be appreciated from the above survey that practitioners in the art, until now, appear to rely on mapping tables with controlled access and duplication privileges to establish and control the relationship between global object identifiers and local virtual addresses, which does nothing to improve programming efficiency. The related unresolved deficiencies are clearly felt in the art and are solved by this invention in the manner described below.

SUMMARY OF THE INVENTION

The system of this invention introduces a new data structure and a process that preserves part of the object identifier in each new local address selected for an object that is transferred into a new virtual address space. By preserving this part of the object identifier, a single truncated pointer is then sufficient to carry all object identifier and object address information. A local mapping table may be used to manage local address assignments but is not essential to the system of this invention.

It is an object of the system of this invention to provide an efficient mechanism for combining an object identifier and an object address into a single object pointer that provides the features of both. It is an advantage of the system of this invention that a single object pointer is sufficient for both global object identifier and local object address with less complexity and in less space than is required separately for both.

It is another object of the system of this invention to provide such an object pointer that can be controlled and manipulated by the operating system as a single data structure to reduce programming complexity. It is a feature of the data structure of this invention that both object identifier and object address information is contained in one object pointer that appears to the operating system to be a single data structure.

The foregoing, together with other objects, features and advantages of this invention, can be better appreciated with reference to the following specification, claims and the accompanying drawing.

BRIEF DESCRIPTION OF THE DRAWING

For a more complete understanding of this invention, reference is now made to the following detailed description of the embodiments, as illustrated in the accompanying drawing, wherein.

DETAILED DESCRIPTION OF THE PREFERRED EMBODIMENTS

The system of this invention is an object-oriented programming structure suitable for application to multitasking systems. In general, object-oriented programming structures include data structures and procedures that control user-definable objects. As used herein, "objects" are data structures holding information that is used by the operating system or by user applications. For instance, a "process object" is a particular object type known in the art for storing information required by the operating system to track the status of a particular user process.

A "process" is the entity to which a virtual memory address space is assigned by the operating system and also is the entity to which process-level objects are assigned. As is known in the art, a particular user may employ multiple processes simultaneously. Whenever a particular user demands system resources, a "top level" process is created to manage all related activities. Any process, including any user process or the top level process, may cause the creation of additional processes, denominated subprocesses or "child" processes. Thus, any "parent" process may create one or more "child" processes.

Figure 1:
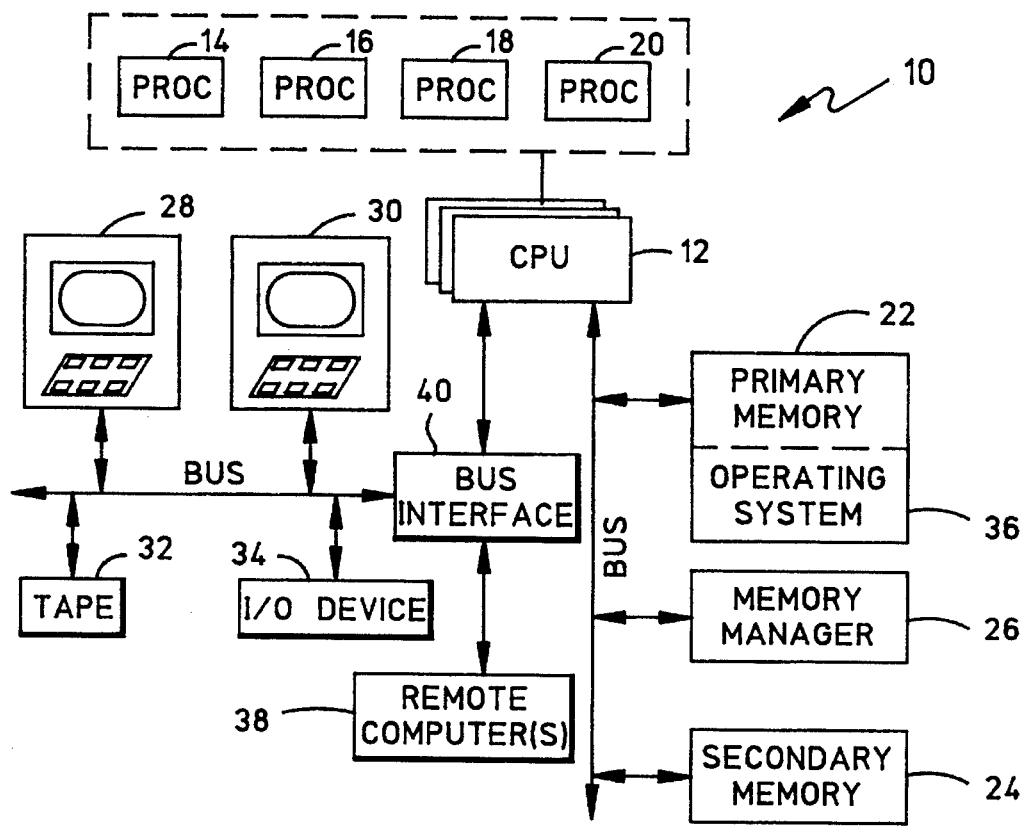
FIG. 1 is a functional block diagram showing a multitasking computer system from the prior art.

FIG. 1 illustrates a computer system 10 that is typical of multitasking computer networks known in the art. System 10 includes a high-speed central processing unit (CPU) 12 that concurrently runs the several processes 14, 16, 18 and 20. CPU 12 may be either a single processor or may include multiple distributed processors. Each process 14–20 is associated with its own virtual memory space, which is mapped in part into high-speed primary memory 22 and in part into lower-speed secondary memory 24 by a virtual memory manager 26. Each process 14–20 is allocated a portion of the available computer resources, including selected peripheral devices such as terminals 28 and 30 and other input-output (I/O) devices 32 and 34. Process allocations also include specified sets of data and data structures in the distributed memory 22 and 24.

Operation and resource allocation in computer system 10 is supervised by the operating system 36 which resides in primary memory 22 for most purposes. Multitasking computer system 10 may also include one or more remotely-located computer systems, exemplified by remote computer 38, which may include other terminals, I/O devices, primary and secondary memory devices and the like (not shown). Data communications among CPU 12, peripheral devices 28–34 and remote computer 38 are controlled by a bus interface 40 in one of several fashions known in the art.

Figure 2:
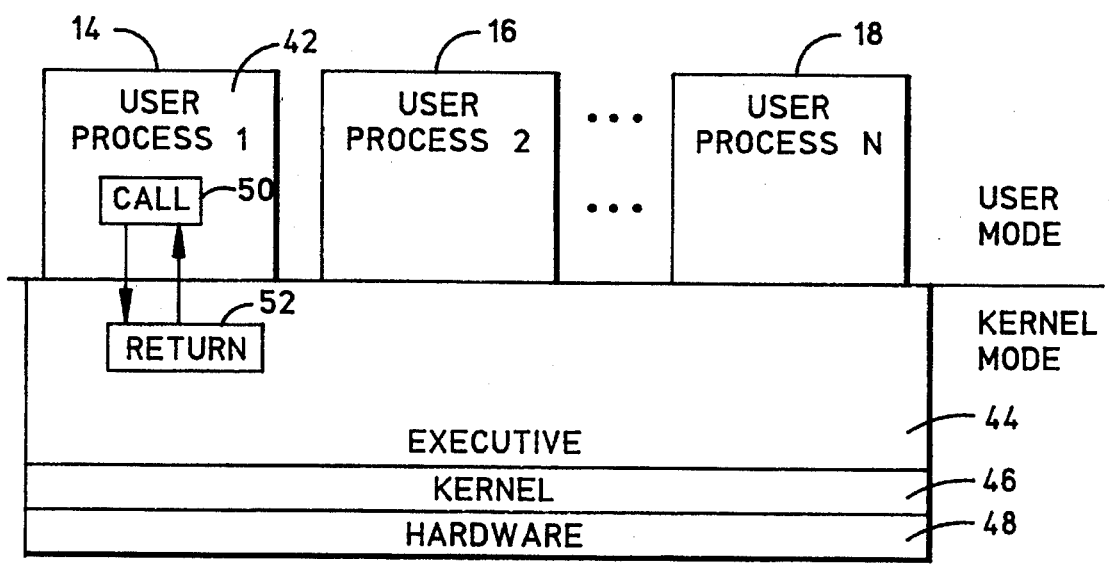
FIG. 2 is a functional block diagram illustrating the virtual memory spaces of several exemplary concurrent processes.

FIG. 2 shows a functional block diagram illustrating the allocation of virtual memory space for several concurrent user processes 14–18. The virtual memory space associated with each process includes a virtual address space, exemplified by virtual address space 42 for process 14, that can be accessed by "user mode" programs as well as "kernel mode" programs having system-wide privilege, including "executive" mode 44, "kernel" mode 46 and "hardware" mode 48 privilege levels known in the art. The virtual memory space 44–48 allocated to kernel mode is common to all user processes running in the multitasking computer system 10. Thus, a predefined portion (44, 46 and 48) of the virtual memory space associated with each user process is occupied by operating system 36 and its data structures. The user mode portion 42 occupies the remainder of the associated virtual memory space assigned to the user process 14.

When a user mode program, exemplified by a user call 50 in user process 14, creates an object or performs an operation on an object, user process 14 calls a kernel mode routine 52 in the executive portion 44 of the associated virtual memory space to perform the necessary object-creation operations. After completion of kernel routine 52, control is returned to user program 50 in process 14. Thus, kernel mode programs are responsible for objection creation and object transfers between independent user processes, such as an object transfer between user process 14 and 16, for instance. Thus, as is well-known in the object-oriented programming art, operating system 36 (through kernel mode programs) is privileged to move objects among user processes 14–20 even though each such user process is associated with a completely independent virtual address space, exemplified by virtual address space 42.

Figure 3A:
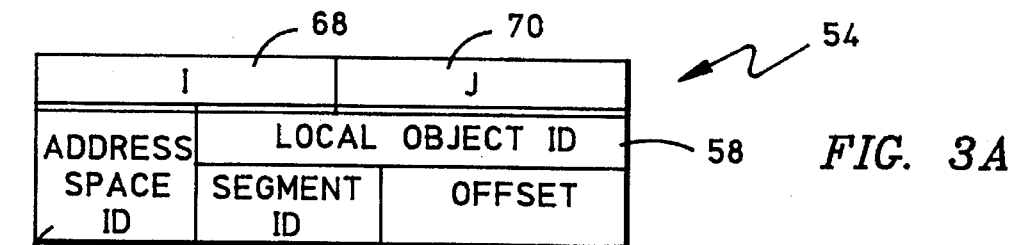
FIGS. 3A–3B illustrate the object identifier and object address data structure parsing of this invention.

FIG. 3A illustrates an object identifier 54 that is created by concatenating an address space identifier 56, representing the virtual address space in which the identified object was first created, to a local object address 58, representing the first virtual address for the identified object. This particular known method for creating object identifier 54 is arbitrary but useful because it ensures creation of a unique object identifier for each new object in system 10.

Figure 3B:
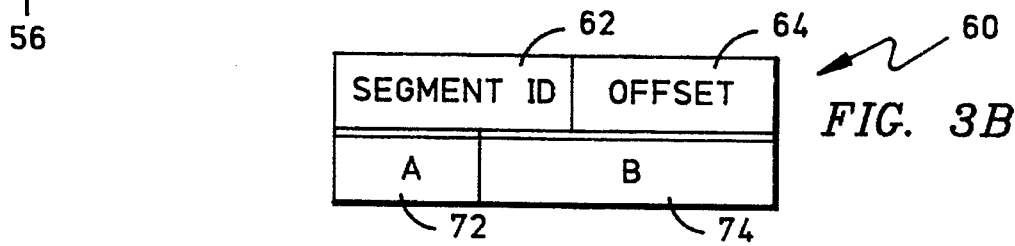

FIG. 3B illustrates a local object address 60 that is created by concatenating a segment identifier 62 in a virtual address space with an offset 64, representing the precise storage location of the object within segment 62 of the associated virtual address space.

Figure 4A:
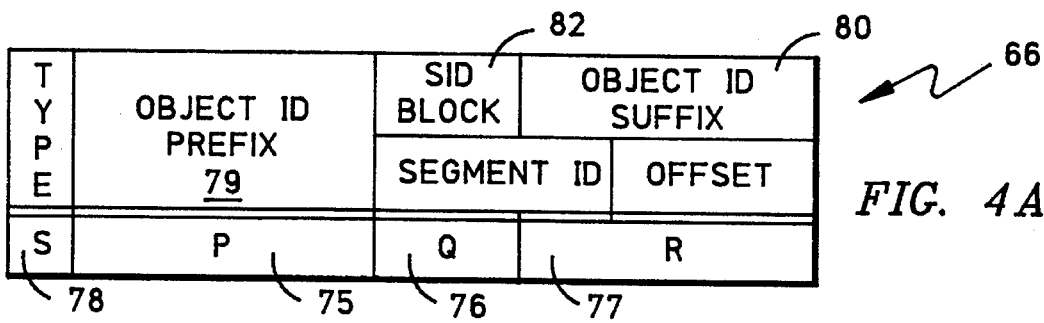
FIGS. 4A–4B show an exemplary embodiment of the hybrid pointer data structure of this invention.

FIG. 4A illustrates the data structure of the object pointer 66 of this invention. By defining pointer 66 to be larger than object address 60, enough information can be stored in pointer 66 to identify both object address 60 and object identifier 54. Instead of using the simple method of appending object identifier 54 to object address 60, which forces object pointer 66 to become unnecessarily large, the unexpectedly advantageous solution of this invention involves preserving some of object identifier 54 in object address 60. This solution opposes the usual practice of preserving address 60 in identifier 54, and is illustrated in more detail in FIG. 4B, which summarizes the various parsings of this invention for structures 54, 60 and 66.

Although FIG. 3B shows object address 60 to be a virtual address logically divided into segment ID 62 and offset 64, and FIG. 3A shows object identifier 54 to be logically divided into address space identifier 56 and local object identifier 58, the method of this invention imposes a more general and useful parsing on these particular structures.

This generality can be appreciated from FIG. 3A wherein object identifier 54 is divided into a first part (I) 68 and a second part (J) 70. Similarly, in FIG. 3B, object address 60 is divided into a first part (A) 72 and a second part (B) 74. Parts (I) 68 and (J) 70 do not necessarily align with identifiers 56 and 58. Similarly, parts (A) 72 and (B) 74 do not necessarily align with segment identifier 62 and offset 64.

Pointer 66 includes three or four parts. These are a first part (P) 75 corresponding to first part (I) 68 from object identifier 54; a second part (Q) 76 corresponding to first part (A) 72 from object address 60; a third part (R) 77 corresponding both to second part (J) 70 from object identifier 54 and second part (B) 74 from object address 60; and an optional fourth part (S) 78, which is useful for internal object pointer flagging purposes as discussed below.

Considering, as a specific example, the International Business Machines Corporation (IBM Corporation) AS/400 addressing architecture known in the art, segment ID 62 is 40 bits long, offset 64 is 24 bits long, and address space identifier 56 can be a 32-bit value that is sufficient to uniquely identify the virtual address generator that produced the original local object address 58, which is 40+24=64 bits in length. Thus, object identifier 54 is 64+32=96 bits or 12 bytes (12B) in length. Object address 60 is 64 bits =8B in length. These exemplary values imply that I+J=12B and A+B=8B, which are generous considering that address space identifier 56 could be associated with an entire system (not just a process). A 32-bit address space identifier 56 permits the combination of up to four billion individual systems divided by the typical number of times each system is reloaded from scratch during its lifetime. Accordingly, a 12B object identifier 54 should be unique across all existing systems over all time. A more general object identifier that is unique across all heterogeneous systems, such as system 10 discussed above in connection with FIGS. 1 and 2, merely requires appending an identifier field that uniquely distinguishes them from other system types.

Figure 4B:
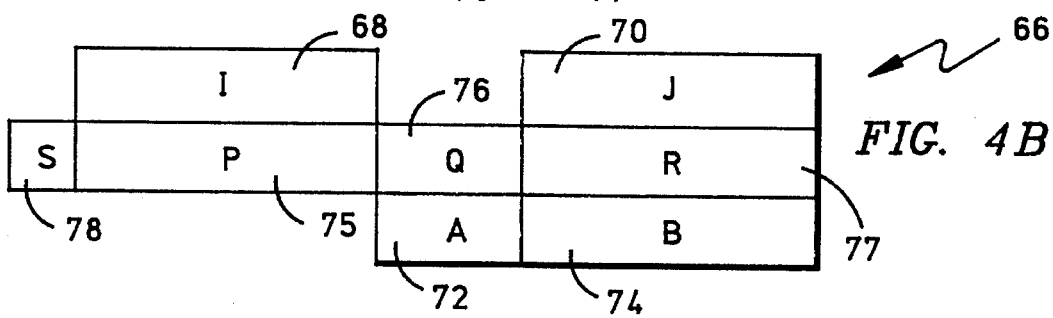

The one byte type field (S) 78 in FIGS. 4A–4B is used in the AS/400 system to distinguish various pointer types and to flag whether the pointer is "resolved" or not. In an illustrative embodiment of object pointer 66, the object identifier prefix 79 is set to 7B in length, which sets the size of first part (I) 68. With an 8B length for object address 60, the entire length of object pointer 66 (SPQR) is 1B+7B+8B=16B. Because object identifier prefix 79 is 7B long, the object identifier suffix 80 is 12B–7B=5B in length, leaving 8B–5B=3B for the segment identifier (SID) block 82, which sets the size of first part (A) 72 in object address 60.

The 5B overlap of object ID suffix 80 with virtual address 60 is simple to implement when an object is first created because local object identifier 58 is then identical to the object's original virtual address 60 in the base virtual address space. An important advantage of the system of this invention is the ease of managing the 5-byte overlap when an object is moved from one process to another. This is accomplished by choosing an available 8B address ($A_1B_1$) in the target virtual address space such that the five object identifier suffix bytes are the same as they were in the previous process. In other words, referring to FIG. 4B, object address (AB) 72–74 is chosen such that field (B) 74 is equal to field (J) 70, both of which are preserved in pointer field (R) 77. With a 40-bit long object ID suffix 80, 24 bits of freedom remain in field (A) 72 for assigning an address based on SID block 82. The 24 bits of freedom in assigning new virtual addresses can be traded off against the number of available address spaces (the size of address space identifier 56). The specific field lengths mentioned above for this embodiment are exemplary only and do not serve to limit the application of the system of this invention. For instance, object identifier suffix 80 may be smaller than SID block 82 for improved address generation flexibility.

Figure 5:
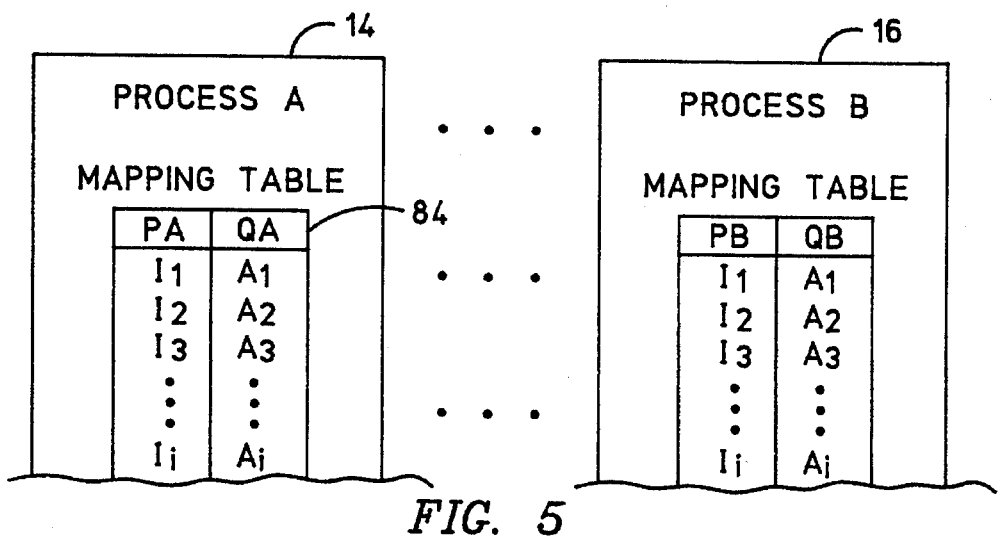
FIG. 5 illustrates an exemplary object mapping table embodiment of this invention.

FIG. 5 shows two processes 14 and 16 each including a mapping table exemplified by mapping table 84 in process 14. Mapping table 84 may be used to more efficiently allocate local object addresses (AB) in a particular virtual address space, as discussed below. Although many different procedures can be used to efficiently manage the selection of values for SID block 82 (field (Q) 76 of pointer 66), one useful approach is now described in connection with FIG. 6.

Figure 6:
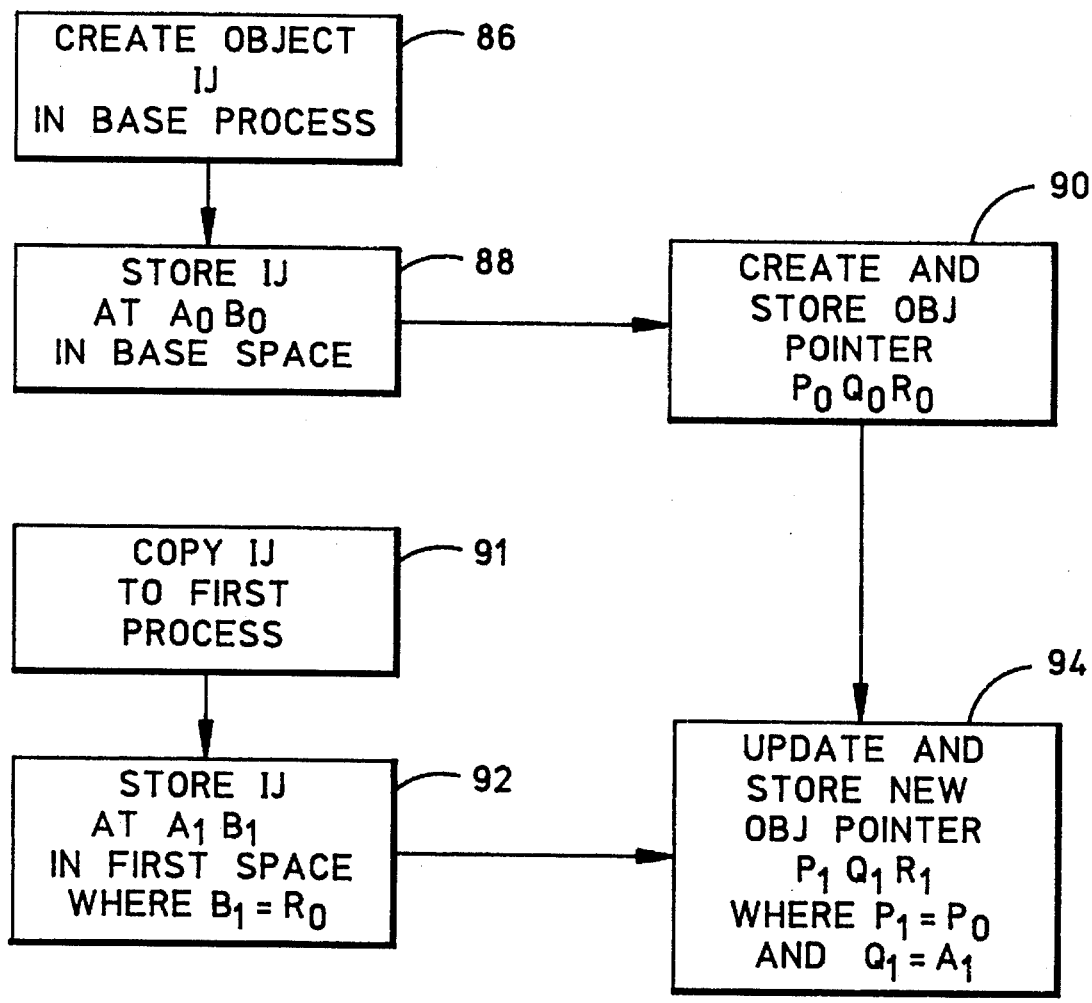
FIG. 6 is a functional block diagram illustrating the object pointer mapping control procedure of this invention.

In FIG. 6, an object is first created at step 86 in a base process. In step 88, an address generator assigns an address $(A_0B_0)$ to the locally-created object (IJ). For management purposes, the address generator chooses addresses starting with low-order addresses for locally-created objects, tracking which SID block values (Q=A) are in use for such local objects by adding an entry to mapping table 84 (FIG. 5), for instance. An object pointer $(P_0Q_0R_0)$ is then created in the base space at step 90.

A requirement to move object (IJ) to a first process different from the base process initiates a system response at step 91. After copying object (IJ) to the first process in step 91, the address generator assigns a new address $(A_1B_1)$ in the first virtual address space at step 92. This is accomplished with reference to object pointer $(P_0Q_0R_0)$ by forcing $B_1=R_0$ in the first address space. The address generator chooses $A_1$ in step 92 by using a role that allocates $A_1$ values for objects restored from other systems, such as selecting from a list of available high-order addresses. Thus, $A_1$ in the first address space is selected from the top of the available address list, although the value $A_0$ (step 88) was selected from the bottom of the available address list in the base space. By maintaining mapping table 84 (FIG. 5) to link the object identifier prefix (I) to SID block value (A) for all objects ever present in virtual address space 14, the local address generator (discussed below in connection with FIG. 8) can quickly select the appropriate value for $A_I$ responsive to the object identifier prefix (I) information contained in field (P) of object pointer (PQR).

In other words, when an object is being restored, the address generator first consults table 84 to find object prefix value $(I_i)$. If $I_i$ is already in table 84, then the corresponding SID block value $(A_i)$ is immediately selected from the table to complete the new storage address (AB). If object identifier prefix $(I_i)$ is not present in mapping table 84, then SID block value $(A_i)$ is selected from the top of an available address list and the two value entry $(I_i, A_i)$ is added to table 84. Finally, in FIG. 6, a new object pointer $(P_1Q_1R_1)$ is created and stored by forcing $P_1=P_0$ and $Q_1=A_1$ ($R_1$ is always equal to $R_0=B$).

Figure 7:
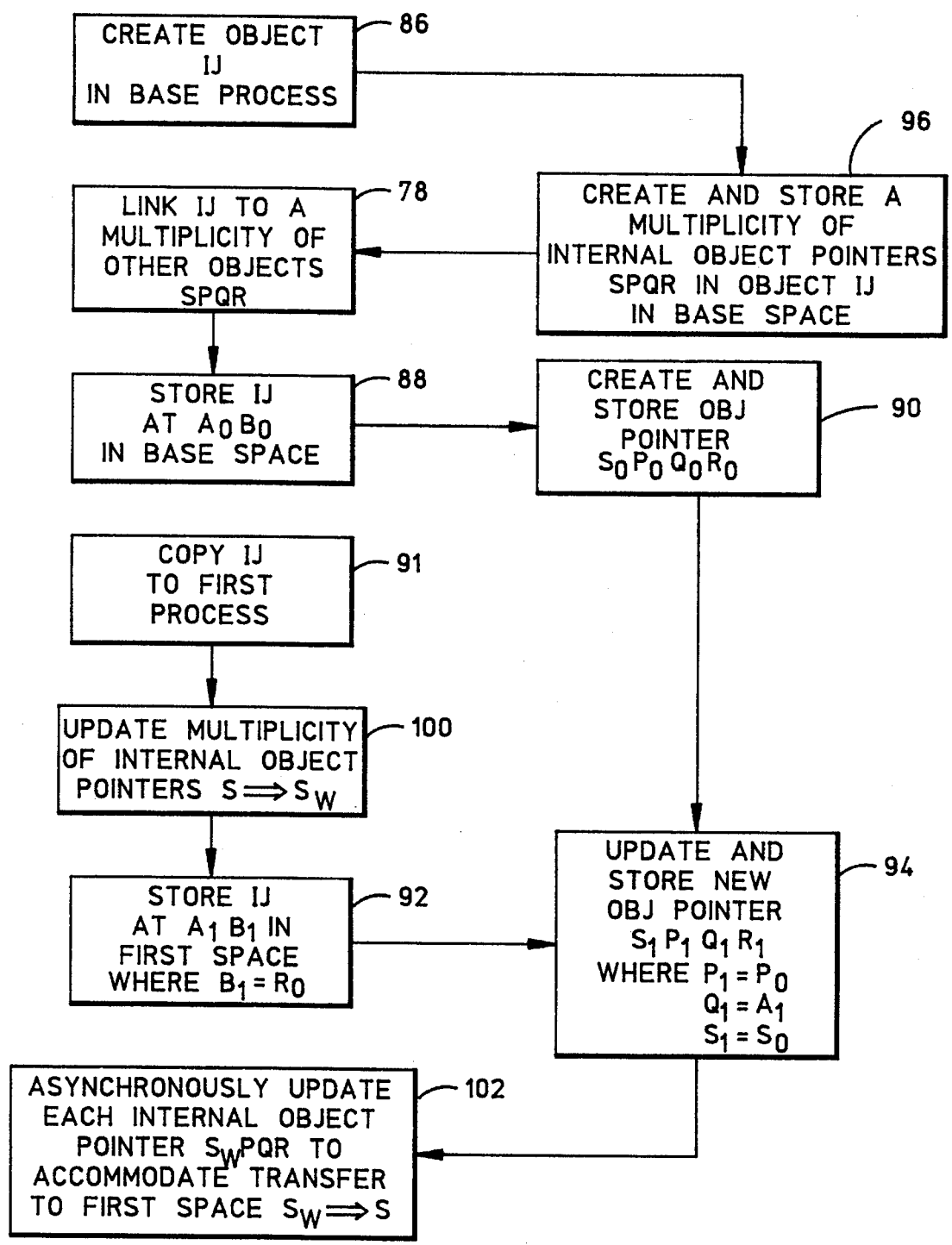
FIG. 7 is a functional block diagram illustrating the lazy object pointer mapping procedure of this invention for networked objects.

When moving an object that is part of a network of objects (containing pointers to other objects) from one address space to another, the internal object pointers must also be updated to reflect assignment to a new virtual address space. FIG. 7 illustrates an exemplary procedure for handling these internal object pointer updates. Assuming that the internal pointer locations in each object being moved are known (the AS/400 system accomplishes this by appending pointer tags to pointer fields within an object), the internal pointers can easily be updated synchronously whenever restoring an object to a new address space. This is simply done by looking up object identifier prefix (I) for each internal pointer in mapping table 84 (FIG. 5) to identify a corresponding SID block value (A) and then updating the internal pointer field (Q=A) corresponding thereto. If object identifier prefix (I) does not appear in mapping table 84, then a new SID block value (A) is assigned and the two value entry (I,A) is added to table 84.

However, as shown in FIG. 7, internal pointers may also be updated asynchronously (lazy update) by using the fourth object pointer field (S) 76. In FIG. 7, step 86 is followed by step 96, wherein a multiplicity of internal object pointers (SPQR) are created for object in the base virtual address space. In step 98, the original object is linked to this multiplicity of other objects through the storage of internal object pointers (SPQR). Similarly, after step 91, the flag field (S) is updated for all internal pointers at step 100 by changing the flag field value to a predetermined value $S_W$ representing restoration of the base object (IJ) to a first process. Following completion of steps 92 and 94, each internal object pointer $(S_W PQR)$ is then asynchronously updated at step 102 to reflect completion of the transfer to the first virtual address space. For instance, internal pointer update step 102 may be deferred until the first reference to the copied object. Step 102 may then be accomplished in the manner discussed above in connection with mapping table 84.

As an alternative to using type field (S) 76, the operating system may reserve a specific value of part (A) 72 that represents an "unresolved address". This establishes a range of virtual addressing that is never allocated by the address generator, raising a "segment fault" when referenced with that prefix. Such special value replaces part (Q) 76 when the object address is unresolved. The effect is to conserve object identifier 54 while invalidating local object address 60. When a user attempts to use the invalid local object address, the system detects a segment fault, which is then used to initiate the "lazy update" of unresolved addresses by replacing part (Q) 76 with the correct part (A) 72 value from mapping table 84. This alternative internal pointer flagging scheme can be advantageously used in any system employing a standard storage protection mechanism.

Figure 8:
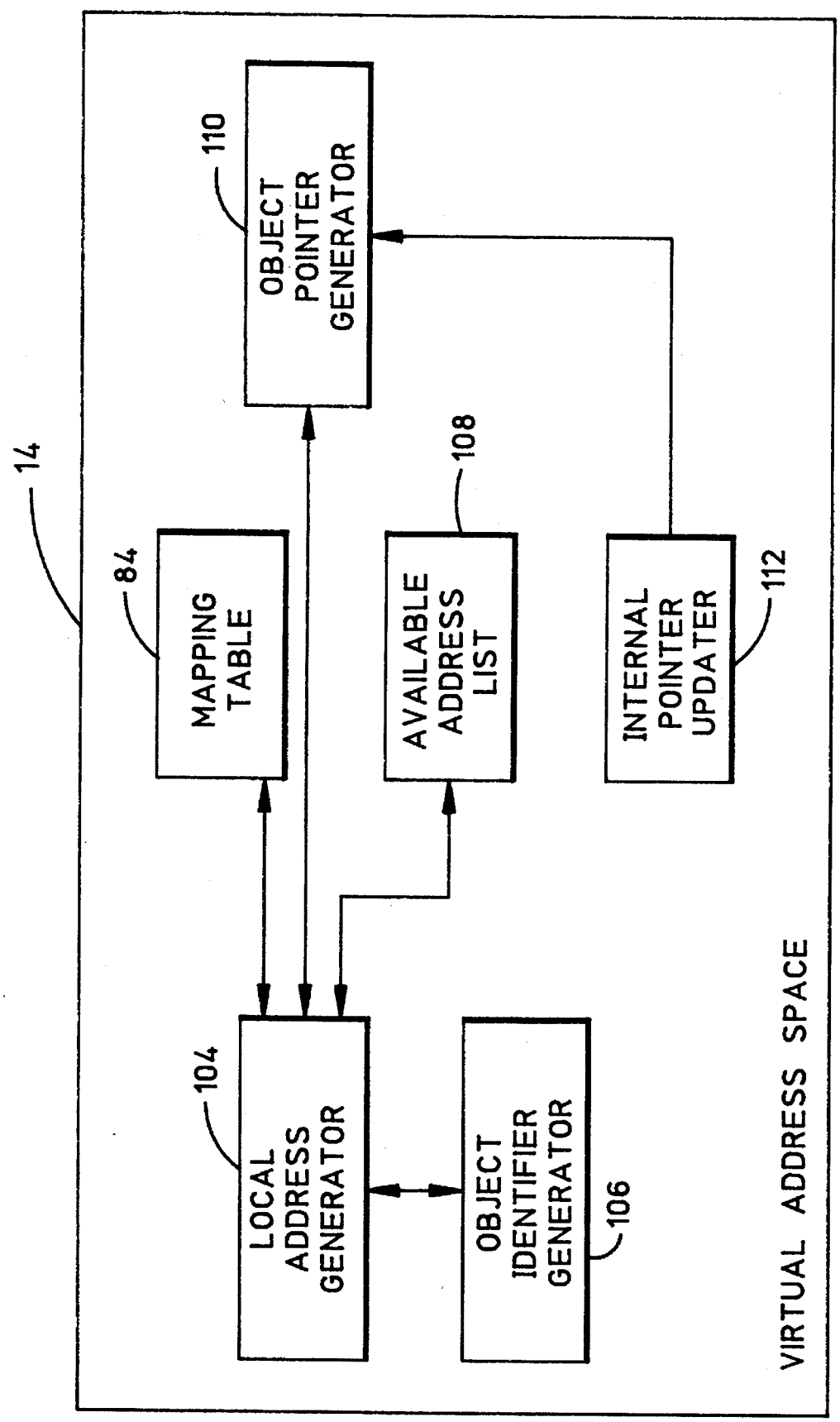
FIG. 8 is a functional block diagram of an exemplary embodiment of the object pointer system of this invention.

FIG. 8 provides an exemplary illustration of the data and process objects required in each virtual address space, exemplified by virtual address space 14, for the system of this invention. Mapping table 84 is discussed above in connection with FIG. 5. The local address generator 104 is also discussed above in connection with FIGS. 6 and 7. An object identifier generator 106 is coupled to local address generator 104 and is responsible for assigning permanent object identifiers to objects created in virtual address space 14. Local address generator 104 is coupled to mapping table 84 and also to an available address list 108, using information from both to select addresses for new and restored objects in the manner discussed above. The object pointer generator 110 is coupled to local address generator 104 and from there to object identifier generator 106, thereby permitting the creation of object pointers as discussed above in connection with FIGS. 4A–4B. Finally, an internal pointer updater 112 functions to update all pointers internal to restored objects in the manner discussed above in connection with FIG. 7. The program object and data object elements shown in FIG. 8 are also coupled to operating system 36 discussed above in connection with FIGS. 1 and 2.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A method of moving objects from one process to another within a computer network having one or more computer systems and distributed memory in which data objects are stored, the processes each being associated with at least one of a plurality of virtual address spaces in the distributed memory and creating a plurality of objects, wherein each created object is identified by an object identifier that uniquely identifies the object across the virtual address spaces, and is identified by an object address that uniquely identifies the object within any one of the virtual address spaces, the method comprising the steps of:

(a) combining a first object identifier, comprising the concatenation of two parts I and J, and a first object address in a first virtual address space comprising the concatenation of two parts $A_0$ and $B_0$, that identify an object to be moved from the first virtual address space into a second virtual address space, to thereby produce a base object pointer comprising the concatenation of a first pointer part, represented as $P_0$, that is equal to the first identifier part I of the first object identifier ($P_0=I$), a second pointer part, represented as $Q_0$, that is equal to the first address part $A_0$ of the first object address ($Q_0=A_0$), and a third pointer part, represented as $R_0$, that is equal to the second identifier part of the first object identifier ($R_0=J=B_0$);

(b) associating the base object pointer ($P_0Q_0R_0$) with the object to be moved from the first virtual address space in the distributed memory;

(c) selecting a second object address in the second virtual address space such that the second object address is logically divided into a first part represented as $A_1$, and a second part represented as $B_1$, such that the second part of the second object address ($B_1$) is equal to the second address part of the first object address ($B_1=B_0=J$);

(d) copying the object to be moved into the second virtual address space of the distributed memory at the second object address ($A_1B_1$), if the object is not already present in the second virtual address space; and (e) associating a second object pointer ($P_1Q_1R_1$) comprising the concatenation of a first part, represented as $P_1$, a second part, represented as $Q_1$, and a third part, represented as $R_1$, with the copied object in the distributed memory such that the first part of the second object pointer $P_1$ is equal to the first identifier part of the base object pointer ($P_1=P_0=I$), the second part of the second object pointer $Q_1$ is equal to the first part of the second object address ($Q_1=A_1$), and the third part of the second object pointer $R_1$ is equal to the third part of the base object pointer ($R_1=R_0=J$).

2. A method as defined in claim 1, wherein each process further includes, in its respective associated virtual address space, an object mapping table having an entry comprising a first part ($P_i$) and a second part ($Q_i$) for each base object pointer created by the first process; and wherein the selecting step (c) comprises the steps of:
(c.1) selecting a second object address ($A_1B_1$) such that $A_1=Q_i$ if there exists an entry ($P_iQ_i$) in the object mapping table such that $P_i=P_0$; and otherwise
(c.2) adding a new entry ($P_1Q_1$) to the object mapping table such that $P_1=P_0$ and $Q=A_1$.

3. A method as defined in claim 2, wherein the distributed memory further includes a plurality of networked objects, each including one or more internal object pointers comprising the concatenation of four parts S, P, Q, and R referring to other networked objects; and wherein the step of copying further comprises:
(d.1) replacing the fourth part (S) of each internal object pointer (SPQR) with a first predetermined value that denotes a pending relocation of the networked object to a new process; and the method further comprises the step of:
(f) for each internal object pointer (SPQR), responsive to the fourth part (S) of each internal object pointer having the first predetermined value, performing the steps of
(f.1) selecting a new object address, comprising two parts A and B, in the second virtual address space such that B=R, and
(f.2) replacing each internal object pointer (SPQR) with a new internal object pointer comprising four parts $S_n$, $P_n$, $Q_n$, and $R_n$ such that $P_n=P$, $Q_n=A$, $R_n=R$, and the fourth part $S_n$ of the internal object pointer equals a second predetermined value that denotes completion of the relocation of each object.

4. A method as defined in claim 3, wherein the selecting step (f.1) comprises the steps of:
(f.1.1) selecting the new object address (AB) such that $A=Q_i$ if there exists an entry ($P_iQ_i$) in the object mapping table such that $P_i=P$; and otherwise
(f.1.2) adding a new entry ($P_nQ_n$) to the mapping table such that $P_n=P$ and $Q_n=A$.

5. A method as defined in claim 7, wherein the performing step (f) is executed asynchronously with the replacing step (e).

6. A method as defined in claim 3, wherein the performing step (f) is executed asynchronously with the replacing step (e).

7. A method as defined in claim 1, wherein the distributed memory further includes a plurality of networked objects each including one or more internal object pointers, represented as the concatenation of four parts S, P, Q, and R, referring to other networked objects, and the step of copying further comprises:
(d.1) replacing the fourth part (S) of each internal object pointer (SPQR) with a first predetermined value that denotes a pending relocation of each object to a new process; and the method further comprises the steps of:
(f) for each internal object pointer (SPQR), responsive to the fourth part (S) having the first predetermined value, performing the steps of
(f.1) selecting a new object address (AB) in the second virtual address space such that B=R, and
(f.2) replacing each internal object pointer (SPQR) with a new internal object pointer comprising four parts $S_n$, $P_n$, $Q_n$, and $R_n$ such that $P_n=P$, $Q_n=A$, $R_n=R$ and the fourth part $S_n$ equals a second predetermined value that denotes completion of the relocation of each object.

8. A method as defined in claim 7, wherein the performing step (f) is executed asynchronously with the replacing step (e).

9. In a multi-tasking network of one or more computer systems with distributed memory in which are stored data and data structures, including a plurality of objects each created by one of a plurality of concurrent processes, each of the processes being associated with at least one of a plurality of virtual address spaces in the distributed memory, each object being stored in one of the associated virtual address spaces at a local virtual object address represented as the concatenation of a first part A and a second part B, each object including a global object identifier that uniquely identifies the object across the virtual address spaces, the global object identifier comprising the concatenation of a first part I and a second part J, a data structure for denoting the global object identifier (IJ) and the local virtual object address (AB) of each object, said distributed memory having a data structure comprising:

a first part P representing the first part (I) of the global object identifier;

a second part Q representing the first part (A) of the local virtual object address; and a third part R representing the second part (J) of the global object identifier, wherein the first and third parts (IJ) are held invariant over the network and J=B.

10. In a multi-tasking network of one or more computer systems with distributed memory in which are stored data and data structures, including a plurality of objects each created by one of a plurality of concurrent processes, each of the processes being associated with at least one of a plurality of virtual address spaces in the distributed memory, each object being stored upon creation in an associated virtual address space at a base object address comprising the concatenation of a first part $A_0$ and a second part $B_0$, a system for moving each object from a first process associated with a first virtual address space to a second process associated with a second virtual address space, the system comprising:

a pointer generator coupled to the associated virtual address space in the distributed memory that combines an object identifier comprising two parts I and J with the base object address ($A_0B_0$), and thereby produces a base object pointer ($P_0Q_0R_0$) logically divided into a first part ($P_0$=I), a second part ($Q_0$=$A_0$), and a third part ($R_0$=J=$B_0$);

first linking means, coupled to the pointer generator in the distributed memory, for associating the base object pointer ($P_0Q_0R_0$) with the object to be moved;

an address generator coupled to the second process in the distributed memory for selecting a first object address ($A_1B_1$) in the second virtual address space such that the first object address can be logically divided into a first part ($A_1$) and a second part ($B_1$) such that $B_1$=$B_0$=J;

copying means coupled to the second process in the distributed memory for copying each object to produce a copied object at the second object address ($A_1B_1$) in the second virtual address space in the distributed memory; and second linking means, coupled to the copying means in the distributed memory, for associating a second object pointer ($P_1Q_1R_1$) with the copied object in the second virtual address space such that $P_1$=$P_0$=I, $Q_1$=$A_1$ and $R_1$=$R_0$=J.

11. A system as defined in claim 10, further comprising:

an object mapping table coupled to each process in the associated virtual address spaces for storing an entry ($P_iQ_i$) representing the first part ($P_i$) and the second part ($Q_i$) for each object pointer created by each process;

entry restoring means coupled to the object mapping table in each associated virtual address space for selecting the second object address ($A_1B_1$) such that $A_1$=$Q_i$ if there exists an entry ($P_iQ_i$) in the object mapping table such that $P_i$=$P_0$; and entry creating means coupled to each object mapping table in each associated virtual address space for adding a new entry ($P_1Q_1$) to each mapping table such that $P_1$=$P_0$ and $Q_1$=$A_1$.

12. A system as defined in claim 11, wherein the distributed memory further includes a plurality of networked objects each including one or more internal object pointers that refer to other network objects, each internal object pointer represented as the concatenation of four parts S, P, Q, and R, the system further comprising:

flagging means, coupled to each process in the distributed memory, for replacing the fourth part (S) of each internal object pointer (SPQR) with a first predetermined value that denotes a pending relocation of each object to a new process;

address selecting means, coupled to each process in the distributed memory, for selecting a new object address (AB) in the second virtual address space such that B=R for each internal object pointer (SPQR); and updating means, coupled to the address selecting means, for replacing each internal object pointer (SPQR) with a new internal object pointer ($S_nP_nQ_nR_n$) such that $P_n$=P, $Q_n$=A, $R_n$=R and the fourth part $S_n$ equals a second predetermined value denoting completion of relocation of each object to the second virtual address space.

13. A system as defined in claim 10, wherein the distributed memory further includes a plurality of networked objects each including one or more internal object pointers that refer to other network objects, each internal object pointer comprising the concatenation of four parts S, P, Q, and R, the system further comprising:

flagging means, coupled to each process in the distributed memory, for replacing the fourth part (S) of each internal object pointer (SPQR) with a first predetermined value that denotes a pending relocation of each object to a new process;

address selecting means, coupled to each process in the distributed memory, for selecting a new object address (AB) in the second virtual address space such that B=R for each internal object pointer (SPQR); and updating means, coupled to the address selecting means, for replacing each internal object pointer (SPQR) with a new internal object pointer ($S_nP_nQ_nR_n$) such that $P_n$=P, $Q_n$=A, $R_n$=R and the fourth part $S_n$ equals a second predetermined value denoting completion of relocation of each object to the second virtual address space.

* * * * *

UNITED STATES PATENT AND TRADEMARK OFFICE
CERTIFICATE OF CORRECTION

PATENT NO. : 5,581,765
DATED : December 3, 1996
INVENTOR(S) : Munroe et al

It is certified that error appears in the above-indentified patent and that said Letters Patent is hereby corrected as shown below:

Column 9:
    Claim 2, line 62 change "Q" to --"$Q_1$"--.

Column 10:
    Claim 5 should depend from Claim 4, not Claim 7.

Signed and Sealed this

First Day of April, 1997

Attest:

BRUCE LEHMAN

*Attesting Officer*     Commissioner of Patents and Trademarks